June 23, 1936.   B. B. MOORE   2,045,045
HEADLIGHT BLINKER FOR DAYLIGHT SIGNALS
Filed Jan. 12, 1931
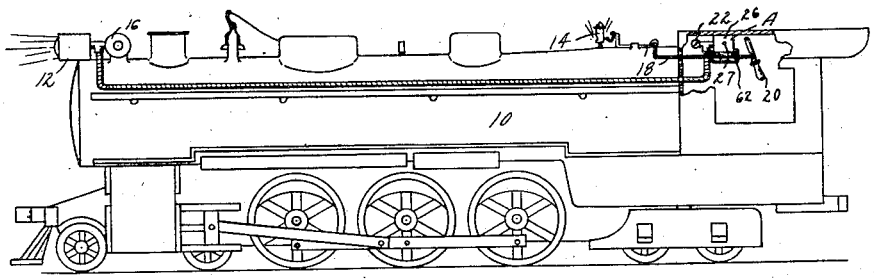
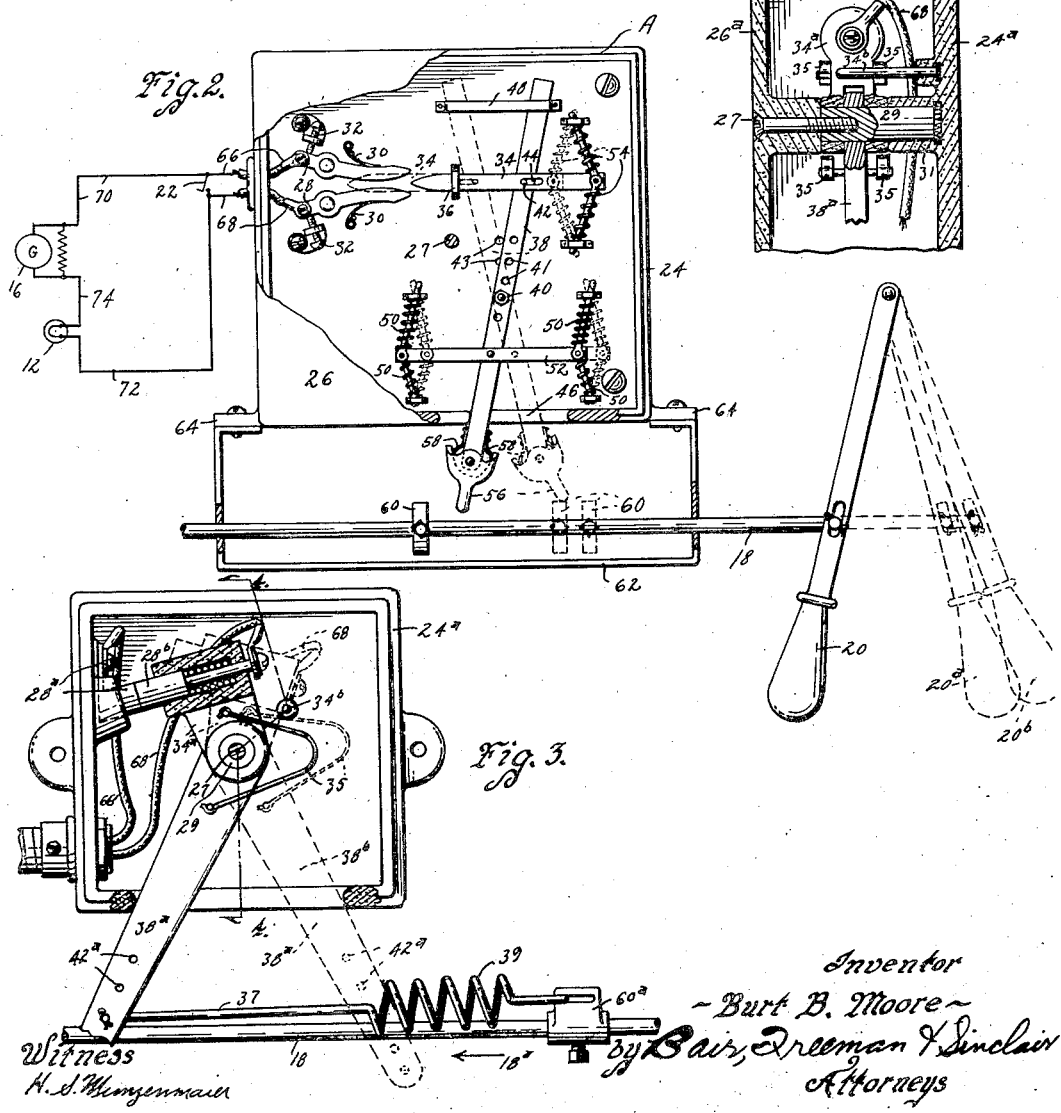
Inventor
~Burt B. Moore~
by Bair, Freeman & Sinclair
Attorneys
Witness
H. S. Wingenmaier Patented June 23, 1936

2,045,045

UNITED STATES PATENT OFFICE 2,045,045

HEADLIGHT BLINKER FOR DAYLIGHT SIGNALS

Burt B. Moore, Sioux City, Iowa

Application January 12, 1931, Serial No. 508,130

1 Claim. (Cl. 74—491)

The object of my invention is to provide a headlight blinker for day light signals which is simple, durable and comparatively inexpensive to manufacture.

A further object of my invention is to provide a means for energizing the head-light of a locomotive whenever the whistle thereof is blown, so that in the daytime, blinking of the head-light will attract the attention of a motorist approaching a railroad crossing, when possibly he does not hear the whistle of the locomotive, this occurring especially when the motorist is driving a closed car in the winter time. Even without directly looking at the train, the blinking head-light thereof will attract his attention, it being unconsciously observed from the corner of his eye, thus warning him of the approach of the locomotive.

A further object of such a device is to signal to the brakeman, who may be located some distance along the railroad track from the locomotive and especially when bundled up in the winter time he is likely not to hear the signal whistle given him by the engineer of the locomotive and consequently signals might be misinterpreted and wrecks occur because of this.

More particularly, it is my object to provide a head-light blinker switch which is shunt connected with the ordinary head-light switch of the locomotive and is so connected with the whistle control rod of the locomotive that the blinker switch is simultaneously actuated to closed circuit position whenever the whistle is blown and returned to open circuit position when the whistle stops blowing.

With these and other objects in view my invention consists in the construction, arrangement and combination of the various parts of my device, whereby the objects contemplated are attained, as hereinafter more fully set forth, pointed out in my claim, and illustrated in the accompanying drawing, in which:

Figure 1 is a side elevation of a locomotive showing my head-light blinker switch applied thereto and operatively connected with the whistle rod.

Figure 2 is an enlarged view of the blinker switch with the cover removed and showing diagrammatically the head-light and generator of the locomotive.

Figure 3 is a view similar to Figure 2 showing a modified form of construction; and Figure 4 is a sectional view on the line 4—4 of Figure 3.

On the accompanying drawing, I have used the reference numeral 10 to indicate generally a locomotive or other vehicle. It is to be understood that my invention may be applied to a steam locomotive or to one of electric or gas engine type, or to any other vehicle having a light which can be used for signalling and an audible signal.

The head-light of the locomotive 10 is indicated at 12, the whistle thereof at 14 and a generator at 16 for supplying current to the head-light 12. A whistle control rod is shown at 18, which is ordinarily connected with a control lever 20. A head-light switch is indicated at 22 for controlling energization of the head-light 12 at night and for disconnecting it from the generator 16 in the daytime.

My head-light blinker control switch is indicated generally at A. It consists of a casing 24, preferably formed of insulating material and provided with a suitable cover 26 together with switch mechanism located within the casing and electrically connected with the circuit of the head-light and mechanically connected with the whistle control rod 18.

The switch mechanism may consist of pivoted contacts 28, spring actuated by springs 30 to engage stops 32, with a bridging contact 34 slidably arranged with respect to a guide 36.

A switch lever 38 is provided and is pivoted on a pivot bolt or the like 40. Additional openings 41 and 43 are provided in the switch lever 38 and the casing 24 for changing the pivotal center of the lever, for thus adjusting the device to operate properly with different travels of whistle rods.

By means of a pin 42 and a slot 44, the bridging contact 34 is operatively connected with the switch lever 38. Guides 46 and 48 are provided for the switch lever and the switch lever is constrained to engage either end of the guide 46 by means of over-center springs 50 and a link 52. Over-center springs 54 are provided for the bridging contact 34 to maintain it in either closed circuit or open circuit position and provides snap action therefor.

A dog 56 is pivoted to the lower end of the switch lever 38 and is normally retained in a central position by springs 58. A collar 60 on the whistle rod 18 is adapted to engage the dog 56 for moving the switch lever 38 whenever the whistle rod is moved for sounding the whistle 14 or stopping the sound thereof, as the case may be.

If found desirable, a guide member 62 may be provided for the whistle rod 18, such guide being mounted on brackets 64 of the casing 24.

In Figures 3 and 4 I have illustrated a simplified and modified form of construction in which a casing 24a is provided having a cover 26a which may be held in position by a screw 27 or the like. The screw 27 extends into a sleeve 29 which is imbedded in a boss 31 of the casing 24a. The sleeve 29 acts as a pivot for a movable contact arm 34a and a switch lever 38a. Over-center springs 35 are provided as a means of operative, snap acting connection between the contact arm 34a and the switch lever 38a.

A contact 28b is movably and resiliently associated with the arm 34a and is coactible with a stationary contact 28a. By means of a spring rod 37 having a coil spring portion 39, the switch lever 38a may be connected with a whistle rod collar 60a adjustably secured to the whistle rod 18. A series of openings 42a are provided in the switch lever 38a for connection of the rod 37 thereto.

Electrical connections

The contacts 28 or 28a and 28b, as the case may be, are connected by wires 66 and 68 with the terminals of the head-light switch 22. The head-light switch is connected in series by means of wires 70 and 72 with the generator and head-light 16 and 12, respectively, the generator and head-light being connected by a wire 74. The switch 22 and the wire connections 70, 72 and 74 will be found on the locomotive and it is merely necessary to shunt connect my head-light blinker switch with the head-light switch 22, which it will be obvious is a comparatively simple matter.

The blinker switch is then suitably connected with the whistle rod (or horn lever as found on some gas and electric cars) or with any movable part of the controlling means for the audible signal.

Practical operation

In the operation of the device shown in Figures 1 and 2, movement of the whistle lever 20 to the position indicated at 20a will cause the collar 60 to engage the dog 56 and swing it relative to the lever 38 after which the lever is moved to the dotted line position illustrated. The springs 50 will cause a quick continuation of the movement of the switch lever 38 in circuit closing position, after which the bridging contact 34 is quickly moved to closed circuit position by the springs 54. Continued movement of the whistle lever 20 to the full "on" position indicated at 20b will cause the collar 60 to pass the dog 56, whereupon the dog will swing back to central position for engagement with the collar 60 on its return travel.

On such return travel, the switch lever 38 will be swung toward open circuit position and the springs 50 will quickly move it to such position. After the starting of such quick movement, the springs 54 will quickly open the circuit by pulling the bridging contact 34 from between the contacts 28.

The device shown in Figures 3 and 4 will operate in a somewhat similar manner, the spring 39 causing slight tension to swing the switch lever 38a to closed circuit position and the over-center springs 35 quickly moving the contact arm 34a from the stop 34b and to closed circuit position, with the contacts 28a and 28b engaging each other whenever the whistle rod 18 is moved to operative position in the direction of the arrow 18a. Any additional movement of the whistle rod 18 after the switch lever 38a has been limited in movement by the slot 38b in the casing 24a will be provided for by extension of the spring 39. It will be obvious that the movement of the whistle rod 18 in an opposite direction will open the blinker switch circuit.

Other types of switches and similar changes can be made without departing from the real spirit and purpose of my invention of a head-light blinker for day light signals and it is therefore my purpose to cover by my claims such modified forms of structure or use of mechanical equivalents, which may be reasonably included within their scope.

I claim as my invention:

Means for controlling a switch from a sliding operating rod comprising a pivoted lever operatively connected with a switch, the end of said lever being swingable along a path adjacent and substantially parallel to the path of travel of said rod, an enlargement on said rod, a dog pivoted to said end of said lever, means for limiting the pivotal movement thereof relative to the lever, means for biasing said dog to a position centrally between its opposite limits of movement, said enlargement being engageable with said dog as said rod slides for first swinging said dog to one of its limits of movement and then swinging said lever, said enlargement due to the swinging of said lever in the arc of a circle, passing by the end of said dog after a predetermined sliding movement of said rod, whereupon said dog assumes a central position to be engaged by said enlargement upon subsequent sliding of the rod in an opposite direction.

BURT B. MOORE.